US011190966B2

(12) United States Patent
Tang

(10) Patent No.: US 11,190,966 B2
(45) Date of Patent: Nov. 30, 2021

(54) INFORMATION INDICATION METHOD, TERMINAL, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 28 days.

(21) Appl. No.: 16/619,265

(22) PCT Filed: Sep. 22, 2017

(86) PCT No.: PCT/CN2017/102912
§ 371 (c)(1),
(2) Date: Dec. 4, 2019

(87) PCT Pub. No.: WO2019/056295
PCT Pub. Date: Mar. 28, 2019

(65) Prior Publication Data
US 2020/0100134 A1 Mar. 26, 2020

(51) Int. Cl.
*H04W 28/16* (2009.01)
*H04W 28/02* (2009.01)

(52) U.S. Cl.
CPC .................. *H04W 28/0263* (2013.01)

(58) Field of Classification Search
CPC ......... H04W 28/0263; H04W 28/0268; H04W 28/16; H04W 28/02; H04W 24/10; H04W 28/24; H04W 48/08; H04W 48/16
(Continued)

(56) References Cited

U.S. PATENT DOCUMENTS

2012/0270538 A1* 10/2012 Meylan ............... H04L 69/32
455/426.1
2014/0128075 A1* 5/2014 Da Silva ........... H04W 36/0083
455/436
(Continued)

FOREIGN PATENT DOCUMENTS

CN 107027151 8/2017
RU 2600456 10/2016

OTHER PUBLICATIONS

3GPP TSG-RAN WG2 NR Ad Hoc R2-1706853, "Precedence of the RRC configured mapping and reflective QoS", LG Electronics Inc., Qingdao, China, Jun. 27-29, 2017 (Year: 2017).*
(Continued)

*Primary Examiner* — Nathan S Taylor
(74) *Attorney, Agent, or Firm* — Hodgson Russ LLP

(57) ABSTRACT

An information indication method includes: receiving, by a terminal, service data adaptation protocol (SDAP) data, and determining, based on reflective quality of service (QoS) indication (RQI) information in a header of the SDAP data, a mapping relationship to be updated, the mapping relationship including: at least one of a first mapping relationship or a second mapping relationship; wherein the first mapping relationship indicates a mapping relationship between an Internet Protocol (IP) flow and a QoS flow corresponding to a first reflective QoS function; the second mapping relationship indicates a mapping relationship between the QoS flow and a data resource bearer (DRB) corresponding to a second reflective QoS function.

8 Claims, 2 Drawing Sheets

(58) Field of Classification Search
USPC .......................................................... 370/310
See application file for complete search history.

(56) References Cited

U.S. PATENT DOCUMENTS

| | | | | |
|---|---|---|---|---|
| 2017/0064750 | A1* | 3/2017 | Madaiah | H04W 76/12 |
| 2017/0317894 | A1* | 11/2017 | Dao | H04L 41/5009 |
| 2017/0359749 | A1* | 12/2017 | Dao | H04W 24/08 |
| 2018/0317120 | A1* | 11/2018 | Wang | H04W 28/0263 |
| 2018/0324631 | A1* | 11/2018 | Jheng | H04L 1/1887 |
| 2019/0028920 | A1* | 1/2019 | Pan | H04L 47/24 |
| 2019/0029057 | A1* | 1/2019 | Pan | H04W 28/12 |
| 2019/0150023 | A1* | 5/2019 | Cho | H04W 28/02 370/235 |
| 2019/0349810 | A1* | 11/2019 | Cho | H04W 28/06 |
| 2019/0387428 | A1* | 12/2019 | Ahmad | H04L 69/08 |
| 2020/0037197 | A1* | 1/2020 | Cho | H04W 76/30 |
| 2020/0128430 | A1* | 4/2020 | Yi | H04W 28/0268 |
| 2020/0128431 | A1* | 4/2020 | Jo | H04W 28/0263 |
| 2020/0154304 | A1* | 5/2020 | Cho | H04W 28/02 |
| 2020/0267753 | A1* | 8/2020 | Adjakple | H04W 72/1226 |
| 2020/0275302 | A1* | 8/2020 | Youn | H04W 28/06 |
| 2021/0144588 | A1* | 5/2021 | Tang | H04W 76/36 |
| 2021/0204160 | A1* | 7/2021 | Jo | H04W 28/02 |

OTHER PUBLICATIONS

Interdigital, "Report from LTE and NR User Plane Break-Out Session," 3GPP TSG-RAN WG2 Meeting #99, Aug. 2017, 60 pages.
SIPO, Office Action for CN Application No. 201911415073.6, dated Nov. 3, 2020.
EPO, Office Action for EP Application No. 17925853.8, dated Dec. 23, 2020.
Huawei, et al., "SDAP Header Format," 3GPP TSG-RAN WG2#99 Meeting, R2-1708932, Aug. 2017.
RUPO, Office Action for RU Application No. 2019143080, dated Dec. 3, 2020.
3rd Generation Partnership Project; Technical Specification Group Radio Access Network; E-UTRA and NR; Service Data Adaptation Protocol (SDAP) specification (Release 15), 3GPP TS 37.324 v1.0.0, Sep. 2017, 15 pages.
3rd Generation Partnership Project; Technical Specification Group Radio Access Network; NR; NR and NG-RAN Overall Description; Stage 2 (Release 15), 3GPP TS 38.300 v1.0.0, Sep. 2017, 59 pages.
NTT DOCOMO, Inc., "Status Report to TSG," 3GPP TSG RAN Meeting #77, RP-171783, Sep. 2017, 284 pages.
WIPO, ISR for PCT/CN2017/102912, dated Jun. 27, 2018.
Catt, "How to update the mapping rule of reflective QoS," 3GPP TSG-RAN WG2 #99, R2-1707938, Aug. 2017, 4 pages.
Ericsson, "SDAP Header Format," 3GPP TSG-RAN WG2 #99, Tdoc R2-1708324, Aug. 2017, 4 pages.
Mediatek Inc., "SDAP header design for reflective QoS indication and QoS flow remapping," 3GPP TSG-RAN WG2 Meeting #99, R2-1708260, Aug. 2017, 7 pages.
Nokia et al., "RQoS indication to UE," 3GPP TSG-RAN WG2 #99, R2-1707992, Aug. 2017, 2 pages.
EPO, Office Action for EP Application No. 17925853.8, dated Mar. 30, 2020.
ISDEC, Office Action for CA Application No. 3066830, dated Feb. 25, 2021.
IPI, Office Action for IN Application No. 201917050936, dated Mar. 30, 2021.
EPO, Office Action for EP Application No. 17925853.8, dated Jun. 10, 2021.
Ericsson, "QoS and SDAP layer aspects in NR", 3GPP TSG-RAN WG2 #98, Tdoc R2-1705116, May 2017, 4 pages.
JPO, Office Action for JP Application No. 2020-500095, dated Aug. 6, 2021.
OPPO, "SDAP PDU format", 3GPP TSG-RAN WG2 Meeting #99, R2-1707747, Aug. 2017, 2 pages.
CMCC, OPPO, "Considerations on one bit RQI", 3GPP TSG-RAN WG2 Meeting # 99bis, R2-1710394, Oct. 2017, 4 pages.

* cited by examiner

INFORMATION INDICATION METHOD, TERMINAL, AND COMPUTER STORAGE MEDIUM

CROSS-REFERENCE TO RELATED APPLICATION

This application is a U.S. national phase application of International Application No. PCT/CN2017/102912, filed Sep. 22, 2017, the entire disclosure of which is incorporated herein by reference.

TECHNICAL FIELD

Embodiments of the present disclosure relate to the field of wireless communication, and more particularly, to an information indicating method, a terminal and a computer storage medium.

BACKGROUND

According to the 3GPP RAN2 #99 meeting, Reflective QoS Indicate (RQI) information is used for simultaneously indicating activation and deactivation of the Reflective QoS function of the Non-Access Stratum (NAS) and the Access Stratum (AS). That is, when the RQI indicates that the NAS Reflective QoS function and the AS Reflective QoS function are in the active state, the terminal needs to separately detect whether the mapping rule of the NAS Reflective QoS and the mapping rule of the AS Reflective QoS are changed.

However, the NAS Reflective QoS function and the AS Reflective QoS function are independent of each other. It is very likely that one of the NAS Reflective QoS function and the AS Reflective QoS function is active and the other is inactive. Therefore, there is currently no effective solution in related art on how to determine the mapping rule corresponding to which function needs to be updated based on the RQI.

SUMMARY

Embodiments of the disclosure provide an information indicating method, a terminal and a computer storage medium, so as to solve the technical problem in the related art.

The embodiments of the disclosure provide an information indicating method. The method includes:

receiving, by a terminal, service data adaptation protocol (SDAP) data, and determining, based on reflective quality of service (QoS) indication (RQI) information in a header of the SDAP data, a mapping relationship to be updated, the mapping relationship including: a first mapping relationship and/or a second mapping relationship;

wherein the first mapping relationship indicates a mapping relationship between an Internet Protocol (IP) flow and a QoS flow corresponding to a first reflective QoS function; the second mapping relationship indicates a mapping relationship between the QoS flow and a data resource bearer (DRB) corresponding to a second reflective QoS function.

In the solution as describe above, the determining a mapping relationship to be updated based on RQI information in a header of the SDAP data includes:

determining by the terminal, when the RQI information in the header of the SDAP data indicates that both the first reflective QoS function and the second reflective QoS function are in an active state, the first mapping relationship and the second mapping relationship need to be updated.

In the solution as describe above, the determining a mapping relationship to be updated based on RQI information in a header of the SDAP data includes:

determining by the terminal, when the RQI information in the header of the SDAP data indicates that the first reflective QoS function is in an active state, the first mapping relationship needs to be updated.

In the solution as describe above, the method further includes: determining by the terminal, based on a first signaling as received, the second reflective QoS function needs to be updated.

In the solution as describe above, the first signaling is a radio resource control (RRC) signaling.

In the solution as describe above, the determining a mapping relationship to be updated based on RQI information in a header of the SDAP data includes:

determining by the terminal, when the RQI information in the header of the SDAP data indicates that the second reflective QoS function is in an active state, the second mapping relationship needs to be updated.

In the solution as describe above, the method further includes:

starting by the terminal, based on the received RQI information, a timer.

In the solution as describe above, the determining a mapping relationship to be updated based on RQI information in a header of the SDAP data includes:

determining by the terminal upon receiving the SDAP data including the RQI, based on whether the timer is in a running state, whether the second mapping relationship needs to be updated.

In the solution as describe above, the determining, based on whether the timer is in a running state, whether the second mapping relationship needs to be updated includes:

determining by the terminal, if the timer is in the running state, the second mapping relationship does not need to be updated.

In the solution as describe above, the determining, based on whether the timer is in a running state, whether the second mapping relationship needs to be updated includes:

determining by the terminal, if the timer expires, the second mapping relationship needs to be updated.

In the solution as describe above, the method further includes:

deleting, by the terminal, the second mapping relationship after the timer expires.

The embodiments of the disclosure further provide a terminal. The terminal includes: a receiving unit and a determining unit, wherein the receiving unit is configured to receive service data adaptation protocol (SDAP) data, the determining unit is configured to determine, based on reflective quality of service (QoS) indication (RQI) information in a header of the SDAP data received by the receiving unit, a mapping relationship to be updated, the mapping relationship including: a first mapping relationship and/or a second mapping relationship; wherein the first mapping relationship indicates a mapping relationship between an Internet Protocol (IP) flow and a QoS flow corresponding to a first reflective QoS function; the second mapping relationship indicates a mapping relationship between the QoS flow and a data resource bearer (DRB) corresponding to a second reflective QoS function.

In the solution as describe above, the determining unit is configured to determine, when the RQI information in the header of the SDAP data indicates that both the first reflective QoS function and the second reflective QoS function are in an active state, the first mapping relationship and the second mapping relationship need to be updated.

In the solution as describe above, the determining unit is configured to determine, when the RQI information in the header of the SDAP data indicates that the first reflective QoS function is in an active state, the first mapping relationship needs to be updated.

In the solution as describe above, the receiving unit is further configured to receive a first signaling;

the determining unit is further configured to determine, based on the first signaling received by the receiving unit, the second reflective QoS function needs to be updated.

In the solution as describe above, the first signaling is a radio resource control (RRC) signaling.

In the solution as describe above, the determining unit is configured to determine, when the RQI information in the header of the SDAP data indicates that the second reflective QoS function is in an active state, the second mapping relationship needs to be updated.

In the solution as describe above, the terminal further includes a starting unit;

the receiving unit is further configured to receive RQI information;

the starting unit is configured to start a timer based on the RQI information received by the receiving unit.

In the solution as describe above, the determining unit is configured to determine, when the receiving unit receives the SDAP data including the RQI, whether the second mapping relationship needs to be updated, based on whether the timer is in a running state.

In the solution as describe above, the determining unit is configured to determine, if the timer is in the running state, the second mapping relationship does not need to be updated.

In the solution as describe above, the determining unit is configured to determine, if the timer expires, the second mapping relationship needs to be updated.

In the solution as describe above, the terminal further includes an updating unit, configured to delete the second mapping relationship after the timer expires.

The embodiments of the disclosure further provide a computer storage medium, storing a computer instruction thereon, the instruction is configured to perform, when being executed by a processor, steps of the information indicating method according to the embodiments of the disclosure.

The embodiments of the disclosure further provide a terminal, including: a communication component for data transmission, a memory, a processor and a computer program stored on the memory and executable by the processor, the processor is configured to perform, when executing the program, steps of the information indicating method according to the embodiments of the disclosure.

According to the information indicating method, terminal and computer storage medium provided by the embodiments of the disclosure, the terminal receives SDAP data, and determines, based on RQI information in a header of the SDAP data, a mapping relationship to be updated, the mapping relationship including: a first mapping relationship and/or a second mapping relationship; the first mapping relationship indicates a mapping relationship between an IP flow and a QoS flow corresponding to a first reflective QoS function; the second mapping relationship indicates a mapping relationship between the QoS flow and a DRB corresponding to a second reflective QoS function. Based on the technical solution provided by the embodiments of the disclosure, there is provided a manner of information indication, achieving determination of necessity for updating the first mapping relationship and/or the second mapping relationship based on RQI.

DETAILED DESCRIPTION

The present disclosure will be described below with reference to the accompanying drawings and detailed embodiments.

Embodiment 1

Figure 1:
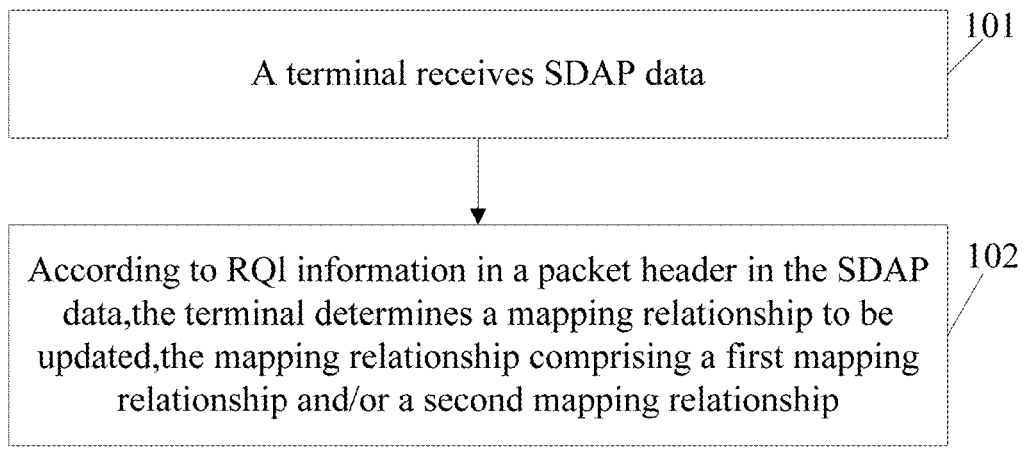
FIG. 1 is a flow chart illustrating an information indicating method according to an embodiment of the disclosure.

The embodiments of the disclosure provide an information indicating method. FIG. 1 is a flow chart illustrating an information indicating method according to an embodiment of the disclosure. As shown in FIG. 1, the method includes following steps.

In step 101, a terminal receives SDAP data.

In step 102, the terminal determines, based on RQI information in a header of the SDAP data, a mapping relationship to be updated, the mapping relationship including: a first mapping relationship and/or a second mapping relationship; wherein the first mapping relationship indicates a mapping relationship between an Internet Protocol (IP) flow and a QoS flow corresponding to a first reflective QoS function; the second mapping relationship indicates a mapping relationship between the QoS flow and a data resource bearer (DRB) corresponding to a second reflective QoS function.

In the embodiment, the reflective QoS functions may include a first reflective QoS function and a second reflective QoS function. In an implementation manner, the first reflective QoS function is the NAS reflective QoS function, and the second reflective QoS function is AS reflective QoS function. Accordingly, the first reflective QoS function corresponds to a mapping relationship between IP flow and QoS flow, and the second reflective QoS function corresponds to a mapping relationship between QoS flow and DRB.

In the embodiment, the RQI information occupies 1 bit in the header of the SDAP data, and the 1 bit is indicative of the mapping relationship that needs to be updated. As an implementation manner, if the bit is valued 1, that is, when the RQI information is 1, it may indicate that the mapping relationship needs to be updated. Correspondingly, if the bit is valued 0, that is, when the RQI information is 0, it may indicate that the mapping relationship does not need to be updated. Optionally, it may be implemented in an opposite way as follows. When the bit is valued 0, that is, when the RQI information is 0, it may indicate that the mapping relationship needs to be updated. Such implementation is not limited in the embodiments of the disclosure As a first implementation manner, the determining a mapping relationship to be updated based on RQI information in the header of the SDAP data includes: determining by the terminal, when the RQI information in the header of the SDAP data indicates that both the first reflective QoS function and the second reflective QoS function are in an active state, the first mapping relationship and the second mapping relationship need to be updated.

Specifically, in this implementation manner, an example is taken where the RQI information being 1 indicates that the mapping relationship needs to be updated. When the RQI information is 1, it indicates that both the first reflective QoS function and the second reflective QoS function are in the active state. Under the active state of both the first reflective QoS function and the second reflective QoS function, the mapping relationship between IP flow and QoS flow corresponding to the first reflective QoS function may be changed, and the mapping relationship between QoS flow and DRB corresponding to the second reflective QoS function may be also changed, thus, the terminal determines that the first mapping relationship and the second mapping relationship need to be updated. That is, it is determined that the mapping relationship between IP flow and QoS flow needs to be updated, and the mapping relationship between QoS flow and DRB needs to be updated.

As a second implementation manner, the determining a mapping relationship to be updated based on RQI information in a header of the SDAP data includes: determining by the terminal, when the RQI information in the header of the SDAP data indicates that the first reflective QoS function is in an active state, the first mapping relationship needs to be updated.

Specifically, in this implementation manner, an example is taken where the RQI information being 1 indicates that the mapping relationship needs to be updated. When the RQI information is 1, it indicates that the first reflective QoS function is in the active state. Under the active state of the first reflective QoS function, the mapping relationship between IP flow and QoS flow corresponding to the first reflective QoS function may be changed, thus, the terminal determines that the first mapping relationship needs to be updated. That is, it is determined that the mapping relationship between IP flow and QoS flow needs to be updated.

Further, the method further includes: determining by the terminal, based on a first signaling as received, the second reflective QoS function needs to be updated.

In this implementation manner, whether the terminal needs to updated the second reflective QoS function is determined based on the first signaling as received. In an embodiment, the first signaling is an RRC signaling, and the terminal receives the RRC signaling and determines, based on the RRC signaling, whether the second reflective QoS function needs to be updated.

As a third implementation manner, the determining a mapping relationship to be updated based on RQI information in a header of the SDAP data includes: determining by the terminal, when the RQI information in the header of the SDAP data indicates that the second reflective QoS function is in an active state, the second mapping relationship needs to be updated.

Specifically, in this implementation manner, an example is taken where the RQI information being 1 indicates that the mapping relationship needs to be updated. When the RQI information is 1, it indicates that the second reflective QoS function is in the active state. Under the active state of the second reflective QoS function, the mapping relationship between QoS flow and DRB corresponding to the second reflective QoS function may be changed, thus, the terminal determines that the second mapping relationship needs to be updated. That is, it is determined that the mapping relationship between QoS flow and DRB needs to be updated.

The method may further include: starting by the terminal, based on the received RQI information, a timer. Accordingly, the determining a mapping relationship to be updated based on RQI information in a header of the SDAP data includes: determining by the terminal upon receiving the SDAP data including the RQI, based on whether the timer is in a running state, whether the second mapping relationship needs to be updated.

In this implementation manner, whether the terminal needs to updated the second reflective QoS function is determined based on a state of the timer. In an embodiment, the timer is started based on RQI information received on the N3 interface. The RQI information received on the N3 interface may be located in a header of a packet. Thus, upon receiving the packet, the terminal extracts the RQI from the packet and starts the time based on the RQI. For example, if RQI is 1, the timer is started. Herein, the expiry time length of the timer may be configured according to a preset rule.

Accordingly, the terminal determines, upon receiving the SDAP data including the RQI, whether the second mapping relationship needs to be updated, based on the state of the timer. Specifically, the determining, based on whether the timer is in a running state, whether the second mapping relationship needs to be updated includes: determining by the terminal, if the timer is in the running state, the second mapping relationship does not need to be updated; and determining by the terminal, if the timer expires, the second mapping relationship needs to be updated. This step may be understood as follows. Before the expiry time length of the timer is passed, the terminal determines, upon receiving the SDAP data including the RQI, the second mapping relationship does not need to be updated. After the expiry time length of the timer is passed, the terminal determines, upon receiving the SDAP data including the RQI, the second mapping relationship needs to be updated.

Further, the method may further include: deleting, by the terminal, the second mapping relationship after the timer expires. This step may be understood as follows. When it is determined the second mapping relationship needs to be updated, the terminal deletes the second mapping relationship.

In the embodiments, if the terminal determines the first mapping relationship needs to be updated, the terminal may perform a process of detecting whether the first mapping relationship is changed, that is, whether the mapping relationship between IP flow and QoS flow corresponding to the NAS reflective QoS is changed. Accordingly, if the terminal determines the second mapping relationship needs to be updated, the terminal may perform a process of detecting whether the second mapping relationship is changed, that is, whether the mapping relationship between QoS flow and DRB corresponding to the AS reflective QoS is changed.

Based on the technical solution provided by the embodiments of the disclosure, there is provided a manner of information indication, achieving determination of necessity for updating the first mapping relationship and/or the second mapping relationship based on RQI.

Embodiment 2

Figure 2:
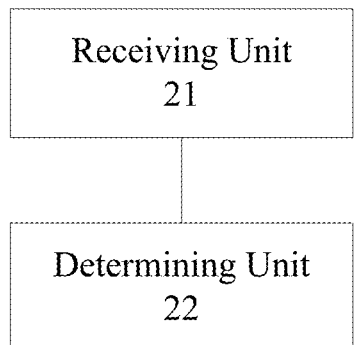
FIG. 2 is a block diagram illustrating a terminal according to an embodiment of the disclosure.

The embodiments of the disclosure provide a terminal. FIG. 2 is a block diagram illustrating a terminal according to an embodiment of the disclosure. As shown in FIG. 2, the terminal includes a receiving unit 21 and a determining unit 22.

The receiving unit 21 is configured to receive SDAP data.

The determining unit 22 is configured to determine, based on RQI information in a header of the SDAP data received by the receiving unit 21, a mapping relationship to be updated, the mapping relationship including: a first mapping relationship and/or a second mapping relationship; wherein the first mapping relationship indicates a mapping relationship between an Internet Protocol (IP) flow and a QoS flow corresponding to a first reflective QoS function; the second mapping relationship indicates a mapping relationship between the QoS flow and a data resource bearer (DRB) corresponding to a second reflective QoS function.

As a first implementation manner, the determining unit 22 is configured to determine, when the RQI information in the header of the SDAP data indicates that both the first reflective QoS function and the second reflective QoS function are in an active state, the first mapping relationship and the second mapping relationship need to be updated.

As a second implementation manner, the determining unit 22 is configured to determine, when the RQI information in the header of the SDAP data indicates that the first reflective QoS function is in an active state, the first mapping relationship needs to be updated.

In an embodiment, the receiving unit 21 is further configured to receive a first signaling;

the determining unit 22 is further configured to determine, based on the first signaling received by the receiving unit 21, the second reflective QoS function needs to be updated.

In an embodiment, the first signaling is a radio resource control (RRC) signaling.

As a third implementation manner, the determining unit 22 is configured to determine, when the RQI information in the header of the SDAP data indicates that the second reflective QoS function is in an active state, the second mapping relationship needs to be updated.

Figure 3:
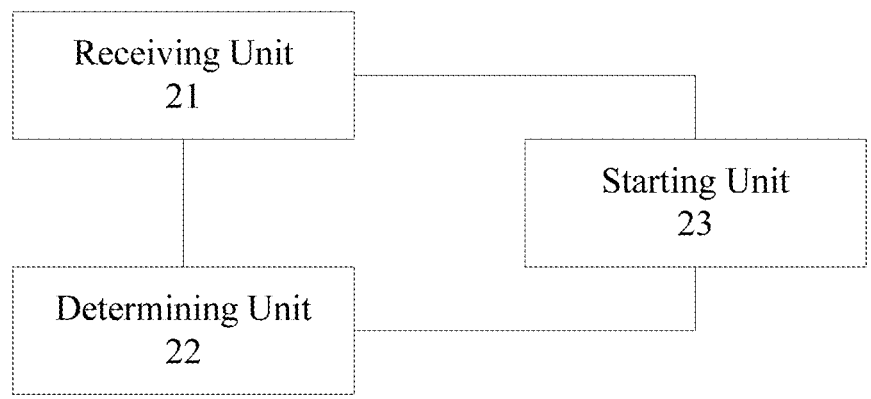
FIG. 3 is another block diagram illustrating a terminal according to an embodiment of the disclosure.

FIG. 3 is another block diagram illustrating a terminal according to an embodiment of the disclosure. As shown in FIG. 3, the terminal further includes a starting unit 23;

the receiving unit 21 is further configured to receive RQI information;

the starting unit 23 is configured to start a timer based on the RQI information received by the receiving unit 21.

In an embodiment, the determining unit 22 is configured to determine, when the receiving unit 21 receives the SDAP data including the RQI, whether the second mapping relationship needs to be updated, based on whether the timer is in a running state.

As an implementation manner, the determining unit 22 is configured to determine, if the timer is in the running state, the second mapping relationship does not need to be updated.

As another implementation manner, the determining unit 22 is configured to determine, if the timer expires, the second mapping relationship needs to be updated.

Figure 4:
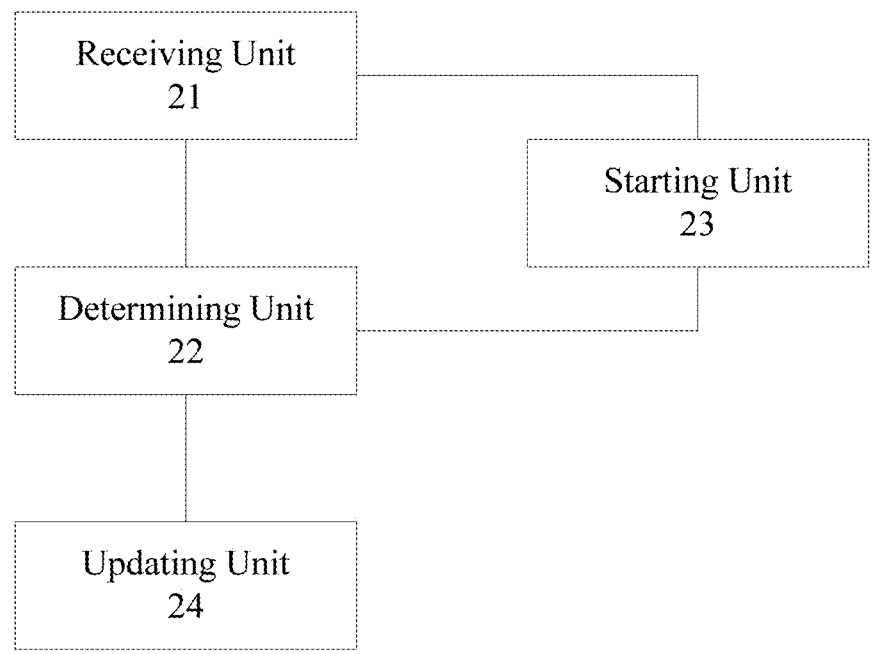
FIG. 4 is yet another block diagram illustrating a terminal according to an embodiment of the disclosure.

FIG. 4 is yet another block diagram illustrating a terminal according to an embodiment of the disclosure. As shown in FIG. 4, the terminal further includes an updating unit 24, configured to delete the second mapping relationship after the timer expires.

In practical application for the embodiments of the disclosure, the determining unit 22, the starting unit 23 and the updating unit 24 in the terminal may be implemented by a central processing unit (CPU), a digital signal processor (DSP, Digital Signal Processor), a micro control unit (MCU, Microcontroller Unit) or a programmable gate array (FPGA), and the receiving unit 21 in the terminal may be implemented by a communication module (including: basic communication kits, an operating system, a communication module, standardized interfaces and protocols, etc.) and transceiver antenna.

It should be noted that, when performing the information processing, the terminal provided by the embodiments are only exemplified by the division of respective foregoing program modules. In practical application, however, the foregoing processing may be allocated by different program modules as needed, that is, the internal structure of the terminal may be divided into different program modules to perform all or part of the processing described above. In addition, the terminal provided by the foregoing embodiment is in the same concept as the embodiment of the method for reporting the state of cache. As the specific implementation process is described in the method embodiment, details are not described herein again.

Embodiment 3

Figure 5:
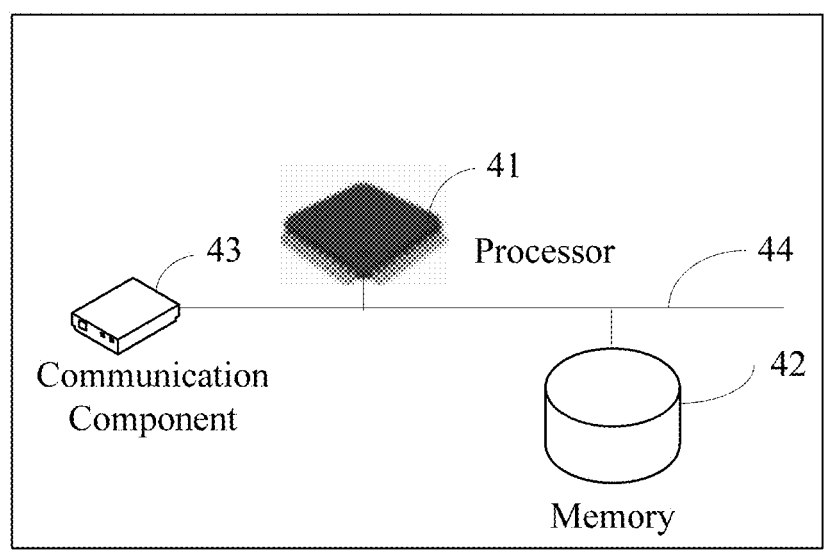
FIG. 5 is a hardware structural diagram illustrating a terminal according to an embodiment of the disclosure.

The embodiments of the disclosure further provide a terminal. FIG. 5 is a hardware structural diagram illustrating a terminal according to an embodiment of the disclosure. As shown in FIG. 5, the terminal includes: a communication component 43 for data transmission, at least one processor 41 and a memory 42 for storing a computer program executable on the processor 41. The various components in the terminal are coupled together by a bus system 44. It may be understood that the bus system 44 is configured to implement connection communication between these components. The bus system 44 includes, in addition to the data bus, a power bus, a control bus, and a status signal bus. However, for clarity of description, various buses are labeled as bus system 44 in FIG. 5.

It may be understood that the memory 42 may be either volatile memory or non-volatile memory, or may include both volatile and non-volatile memory. The non-volatile memory may be a Read Only Memory (ROM), a Programmable Read-Only Memory (PROM), or an Erasable Programmable Read-Only Memory (EPROM), Electrically Erasable Programmable Read-Only Memory (EEPROM), Ferromagnetic Random Access Memory (FRAM), flash memory, magnetic surface memory, optical disk, or Compact Disc Read-Only Memory (CD-ROM); where the magnetic surface memory may be a disk storage or a tape storage. The volatile memory may be a Random Access Memory (RAM) that acts as an external cache. By way of example and not limitation, many forms of RAM are available, such as Static Random Access Memory (SRAM), Synchronous Static Random Access Memory (SSRAM), Dynamic Random Access (SSRAM), Dynamic Random Access Memory (DRAM), Synchronous Dynamic Random Access Memory (SDRAM), Double Data Rate Synchronous Dynamic Random Access Memory (DDRSDRAM), enhancement Enhanced Synchronous Dynamic Random Access Memory (ESDRAM), Synchronous Dynamic Random Access Memory (SLDRAM), and Direct Memory Bus Random Access Memory (DRRAM). The memory 42 described in the embodiments of the disclosure is intended to include, but not limited to, these and any other suitable types of memory.

The method disclosed in the foregoing embodiments of the disclosure may be applied to the processor 41 or implemented by the processor 41. The processor 41 may be an integrated circuit chip with signal processing capabilities. In an implementation process, each step of the above method may be completed by an integrated logic circuit in a form of hardware in the processor 41 or by an instruction in a form of software. The processor 41 described above may be a general purpose processor, a DSP, or other programmable logic device, discrete gate or transistor logic device, discrete hardware component, or the like. The processor 41 may implement or perform the methods, steps, and logic blocks disclosed in the embodiments of the disclosure. The general purpose processor may be a microprocessor or any conventional processor or the like. The steps of the method disclosed in the embodiments of the disclosure may be directly implemented as a hardware decoding processor, or may be performed by a combination of hardware in the decoding processor and software modules. The software modules may reside in a storage medium located in memory 42, and the processor 41 reads information in memory 42 and, in conjunction with its hardware, performs the steps of the foregoing method.

In an exemplary embodiment, the terminal may be implemented by one or more Application Specific Integrated Circuits (ASICs), DSPs, Programmable Logic Devices (PLDs), Complex Programmable Logic Devices (CPLDs), FPGAs, general purpose processors, controllers, MCUs, microprocessors, or other electronic components, so as to perform the foregoing methods.

In an embodiment, the processor 41 is configured to, when executing the program, receive SDAP data, and determine, based on RQI information in a header of the SDAP data, a mapping relationship to be updated, the mapping relationship including: a first mapping relationship and/or a second mapping relationship; wherein the first mapping relationship indicates a mapping relationship between an Internet Protocol (IP) flow and a QoS flow corresponding to a first reflective QoS function; the second mapping relationship indicates a mapping relationship between the QoS flow and a data resource bearer (DRB) corresponding to a second reflective QoS function.

As an implementation manner, the processor 41 is configured to, when executing the program, determine, when the RQI information in the header of the SDAP data indicates that both the first reflective QoS function and the second reflective QoS function are in an active state, the first mapping relationship and the second mapping relationship need to be updated.

As an implementation manner, the processor 41 is configured to, when executing the program, determine, when the RQI information in the header of the SDAP data indicates that the first reflective QoS function is in an active state, the first mapping relationship needs to be updated.

As an implementation manner, the processor 41 is configured to, when executing the program, determine, based on the first signaling as received, the second reflective QoS function needs to be updated.

In an embodiment, the first signaling is an RRC signaling.

As an implementation manner, the processor 41 is configured to, when executing the program, determine, when the RQI information in the header of the SDAP data indicates that the second reflective QoS function is in an active state, the second mapping relationship needs to be updated.

In an embodiment, the processor 41 is configured to, when executing the program, start a timer based on received RQI information.

In the implementation manner, the processor 41 is configured to, when executing the program, determine upon receiving the SDAP data including the RQI, based on whether the timer is in a running state, whether the second mapping relationship needs to be updated.

As an implementation manner, the processor 41 is configured to, when executing the program, determine the second mapping relationship does not need to be updated if the timer is in the running state.

As an implementation manner, the processor 41 is configured to, when executing the program, determine the second mapping relationship needs to be updated if the timer expires.

As an implementation manner, the processor 41 is configured to, when executing the program, delete the second mapping relationship after the timer expires.

Embodiment 4

The embodiments of the disclosure further provide a computer storage medium, such as the memory 42 storing the computer program as show in FIG. 5. The foregoing computer program may be executed by the processor 41 of the device to perform the steps described in the foregoing method. The computer storage medium may be a memory such as FRAM, ROM, PROM, EPROM, EEPROM, Flash Memory, magnetic surface memory, optical disk, or CD-ROM; or may be various devices including one or any combination of the above memories.

In an embodiment, the computer storage medium provided by embodiments of the disclosure stores a computer program thereon, the computer program is used for, when being executed by a processor, performing: receiving SDAP data, and determining, based on RQI information in a header of the SDAP data, a mapping relationship to be updated, the mapping relationship including: a first mapping relationship and/or a second mapping relationship; wherein the first mapping relationship indicates a mapping relationship between an Internet Protocol (IP) flow and a QoS flow corresponding to a first reflective QoS function; the second mapping relationship indicates a mapping relationship between the QoS flow and a data resource bearer (DRB) corresponding to a second reflective QoS function.

As an implementation manner, the computer program is used for, when being executed by the processor, performing: determining, when the RQI information in the header of the SDAP data indicates that both the first reflective QoS function and the second reflective QoS function are in an active state, the first mapping relationship and the second mapping relationship need to be updated.

As an implementation manner, the computer program is used for, when being executed by the processor, performing: determining, when the RQI information in the header of the SDAP data indicates that the first reflective QoS function is in an active state, the first mapping relationship needs to be updated.

In an embodiment, the computer program is used for, when being executed by the processor, performing: determining, based on a first signaling as received, the second reflective QoS function needs to be updated.

In an embodiment, the first signaling is an RRC signaling.

As an implementation manner, the computer program is used for, when being executed by the processor, performing: determining, when the RQI information in the header of the SDAP data indicates that the second reflective QoS function is in an active state, the second mapping relationship needs to be updated.

In an embodiment, the computer program is used for, when being executed by the processor, performing: starting a timer based on the received RQI information.

In an embodiment, the computer program is used for, when being executed by the processor, performing: determining upon receiving the SDAP data including the RQI, based on whether the timer is in a running state, whether the second mapping relationship needs to be updated.

As an implementation manner, the computer program is used for, when being executed by the processor, performing: determining, if the timer is in the running state, the second mapping relationship does not need to be updated.

As an implementation manner, the computer program is used for, when being executed by the processor, performing: determining, if the timer expires, the second mapping relationship needs to be updated.

As an implementation manner, the computer program is used for, when being executed by the processor, performing: deleting the second mapping relationship after the timer expires.

From several embodiments provided in the application, it should be understood that the disclosed terminals and methods may be implemented by means of other manners. The device embodiments described above are merely exemplary. For example, the unit partition is merely a logic functional partition. In actual implementation, additional manners of partitioning may be available. For example, multiple units or components may be combined or integrated into another system, or some features may be ignored or not executed. In addition, the displayed or discussed mutual couplings or direct couplings or communication connections among various components may be implemented by using some interfaces. The indirect couplings or communication connections between the apparatuses or units may be implemented in electronic, mechanical, or other forms.

The units described as separate parts may be or may not be physically separate, and parts displayed as units may be or may not be physical units, that is, either located at one place or distributed on a plurality of network units. Units may be selected in part or in whole according to actual needs to implement the objectives of the embodiments of the present disclosure.

In addition, functional units in the embodiments of the present disclosure may be integrated into one processing unit, or each of the units may exist alone physically, or two or more units are integrated into one unit. The integrated units may be implemented in the form of hardware or in the form of hardware plus software functional units.

Those skilled in the art may understand that all or part of the steps for implementing the above method embodiments may be completed by using hardware related to the program instructions. The foregoing program may be stored in a computer readable storage medium, and the program is used for performing, when being executed, the steps including the foregoing method embodiments; and the foregoing storage medium may include: a removable storage device, ROM, RAM, a magnetic disk, or an optical disk, and the like, which can store program codes.

Optionally, when the foregoing integrated units of the disclosure are implemented in the form of a software functional module and sold or used as an independent product, it may be stored in a computer-readable storage medium. Based on such understanding, the technical solution of the embodiments of the present disclosure in essence, or a part thereof contributing to the prior art, may be embodied in the form of software products, which may be stored in a storage medium, including some instructions to cause a computer device (a personal computer, a server or a network device and so on) to perform all or a part of steps of the method as recited in the embodiments of the present disclosure. The foregoing storage medium may include: a removable storage device, ROM, RAM, a magnetic disk, or an optical disk, and the like, which can store program codes.

The abovementioned embodiments are merely specific embodiments of the present disclosure, but the protection scope of the embodiments of the present disclosure is not limited thereto. Any variation or substitution easily conceivable to a person of ordinary skills in the art within the technical scope disclosed in the present disclosure shall fall into the protection scope of the embodiments of the present disclosure. Therefore, the protection scope of the embodiments of the present disclosure shall be subject to that of the claims.

What is claimed is:

1. An information indicating method, the method comprising:
   receiving, by a terminal, service data adaptation protocol (SDAP) data, and
   determining, based on reflective quality of service (QoS) indication (RQI) information in a header of the SDAP data, whether to update a first mapping relationship between an Internet Protocol (IP) flow and a QoS flow corresponding to a non-access stratum (NAS) reflective QoS function; and
   determining by the terminal, based on a radio resource control (RRC) signaling as received, a second mapping relationship between the QoS flow and a data resource bearer (DRB) corresponding to an access stratum (AS) reflective QoS function needs to be updated;
   wherein the method further comprises:
   determining by the terminal, when the RQI information in the header of the SDAP data indicates that the AS reflective QoS function is in an active state, the second mapping relationship needs to be updated;
   starting by the terminal, based on the received RQI information, a timer; and
   determining by the terminal upon receiving the SDAP data including the RQI, based on whether the timer is in a running state, whether the second mapping relationship needs to be updated.

2. The method of claim 1, wherein the determining, based on RQI information in the header of the SDAP data, whether to update the first mapping relationship comprises:
   determining by the terminal, when the RQI information in the header of the SDAP data indicates that the NAS reflective QoS function is in an active state, the first mapping relationship needs to be updated.

3. The method of claim 1, wherein the determining, based on whether the timer is in a running state, whether the second mapping relationship needs to be updated comprises:
   determining by the terminal, if the timer is in the running state, the second mapping relationship does not need to be updated.

4. The method of claim 1, wherein the determining, based on whether the timer is in a running state, whether the second mapping relationship needs to be updated comprises:
   determining by the terminal, if the timer expires, the second mapping relationship needs to be updated.

5. A non-transitory computer storage medium, storing a computer instruction, the instruction is configured to perform, when being executed by a processor, an information indicating method comprising:
   receiving service data adaptation protocol (SDAP) data; and
   determining, based on reflective quality of service (QoS) indication (RQI) information in a header of the SDAP data, whether to update a first mapping relationship between an Internet Protocol (IP) flow and a QoS flow corresponding to a non-access stratum (NAS) reflective QoS function; and determining by the processor, based on a radio resource control (RRC) signaling as received, a second mapping relationship between the QoS flow and a data resource bearer (DRB) corresponding to an access stratum (AS) reflective QoS function needs to be updated;

wherein the information indicating method further comprises:

determining by the processor, when the RQI information in the header of the SDAP data indicates that the AS reflective QoS function is in an active state, the second mapping relationship needs to be updated;

starting by the processor, based on the received RQI information, a timer; and determining by the processor upon receiving the SDAP data including the RQI, based on whether the timer is in a running state, whether the second mapping relationship needs to be updated.

6. A terminal, comprising a communication component for data transmission, a processor and a memory for storing a computer program executable by the processor, the processor is configured to perform, when executing the program, receiving, through the communication component, service data adaptation protocol (SDAP) data; and determining, based on reflective quality of service (QoS) indication (RQI) information in a header of the SDAP data, whether to update a first mapping relationship between an Internet Protocol (IP) flow and a QoS flow corresponding to a non-access stratum (NAS) reflective QoS function; and determining, based on a radio resource control (RRC) signaling as received, a second mapping relationship between the QoS flow and a data resource bearer (DRB) corresponding to an access stratum (AS) reflective QoS function needs to be updated;

wherein the processor is further configured to perform:

determining, when the RQI information in the header of the SDAP data indicates that the AS reflective QoS function is in an active state, the second mapping relationship needs to be updated;

starting a timer based on the received RQI information; and determining upon receiving the SDAP data including the RQI, based on whether the timer is in a running state, whether the second mapping relationship needs to be updated.

7. The terminal of claim 6, wherein the processor is configured to perform:

determining, when the RQI information in the header of the SDAP data indicates that the NAS reflective QoS function is in an active state, the first mapping relationship needs to be updated.

8. The terminal of claim 6, wherein the processor is configured to perform at least one action of:

determining, if the timer is in the running state, the second mapping relationship does not need to be updated; or determining, if the timer expires, the second mapping relationship needs to be updated.

* * * * *